US00RE35638E

United States Patent [19]

Novotny

[11] E Patent Number: Re. 35,638

[45] Reissued Date of Patent: Oct. 21, 1997

[54] BURGLAR ALARM AND DOOR CHIME

[76] Inventor: Raymond J. Novotny, 34 Crimson Court East, Sewell, N.J. 08080

[21] Appl. No.: 310,662

[22] Filed: Nov. 8, 1994

Related U.S. Patent Documents

Reissue of:

[64] Patent No.: 5,268,671
Issued: Dec. 7, 1993
Appl. No.: 859,889
Filed: Mar. 30, 1992

[51] Int. Cl.[6] ..... G08B 13/08; G08B 17/10; G08B 19/00

[52] U.S. Cl. ..... 340/545; 340/628; 340/693

[58] Field of Search ..... 340/545, 546, 340/628, 693

[56] References Cited

U.S. PATENT DOCUMENTS

| | | | |
|---|---|---|---|
| 4,123,752 | 10/1978 | Novotny | 340/545 |
| 4,258,358 | 3/1981 | Lee et al. | 340/547 |
| 4,258,359 | 3/1981 | McLamb | 340/546 |
| 5,268,671 | 12/1993 | Novotny | 340/545 |

*Primary Examiner*—Glen Swann
*Attorney, Agent, or Firm*—Sanford J. Piltch

[57] ABSTRACT

A battery operated combination burglar alarm and door chime is mounted to the inside of a door. The alarm mode is capable of being armed from either side of the door. A dead bolt slide cooperates with a plate fastened to the door frame to manually arm the device from the inside with the door closed. A plunger slide also cooperates with the plate fastened to the door frame and a mode selection switch to effect either a chime mode or a delayed alarm mode when the door is opened. The delayed alarm mode being activated with the door open to permit pre-arming the device followed by automatic arming of the device when the door is closed. Depending upon the alarm mode of operation selected, unauthorized opening of the door can either lock the door and instantaneously sound an alarm or sound an alarm after a predetermined time when the door is opened. A combination switch deactivates the alarm and chime modes and another switch can alter the combination. An optional, independently powered smoke detector may be integrated with the above.

20 Claims, 3 Drawing Sheets

BURGLAR ALARM AND DOOR CHIME

Matter enclosed in heavy brackets [ ] appears in the original patent but forms no part of this reissue specification; matter printed in italics indicates the additions made by reissue.

BACKGROUND OF THE INVENTION

This invention relates to a battery operated burglar alarm in combination with a door chime adapted to a door or the like. Specifically, the device includes instantaneous and simultaneous mechanical locking and alarm means for internal security and mode selection means for achieving the door chime mode or the re-entry alarm delay mode. The above described device is an improvement in function and structure over my previously patented device described in U.S. Pat. No. 4,123,752 dated Oct. 31, 1978.

Many homeowners and apartment dwellers have limited choice in obtaining a versatile, inexpensive, simple-to-operate and install, door-mounted security device. Most effective security systems are costly hard-wired or wireless transmission types that require skill to install and are complex to operate or program. At the other end of the security spectrum are marginal door-mounted security devices that may be classified as "gadgets." The novelty and utility in the combined function and structure of the present invention is to fill the door security void needed by the average homeowner and apartment dweller. It comprises a device that has the versatility to produce loud burglar alarm sounds or pleasant door chime tones and also provides for deadbolt security. The present invention, compared to my U.S. Pat. No. 4,123,752 device, integrates a door chime mode with the re-entry alarm delay security mode and is simpler to operate. In addition to the above modes of operation the device can readily incorporate a smoke detector sensing unit of existing manufacturers. This is particularly advantageous to condo and apartment dwellers who usually share a common vestibule for their entrance doors. Smoke traveling from an adjacent condo or apartment could accumulate in the common vestibule and flow under the door or other sources of door leakage and trigger the smoke detector in the door-mounted device. Thus, a condo or apartment dweller could be alerted to a fire in an adjacent unit. Full scale prototypes containing an available smoke detector sensing unit within the burglar and door chime device have proven this concept to be very practical.

SUMMARY OF THE INVENTION

Accordingly, beside the objects and advantages described in my U.S. Pat. No. 4,123,752, several objects and advantage of the present invention are:

a) to provide a door-mounted security device having three operating security modes and convenient switching means between operating modes namely:
   1) to instantaneously actuate a deadbolt lock and simultaneously sound an alarm when unauthorized opening of a door occurs.
   2) to permit re-entry of an authorized person and allow sufficient delay time to de-arm the device and prevent the alarm from sounding.
   3) to provide for a pleasant door chime tone mode to audibly monitor the opening and closing of a door during normal use.
   4) to conveniently switch between the re-entry and chime security modes.

b) to provide a device that can be manufactured to adapt within its structure a known smoke detection sensing unit having its own battery.

c) to manufacture a device that consists of two main subassemblies, namely: a mechanical and an electrical subassembly that are readily joined together to comprise the final assembly.

d) to provide mechanical and electrical subassemblies that are complete by themselves and can be manufactured and tested independently of each other.

e) to provide a blinking light source visible from the front of the device that indicates the arming status of the instantaneous and delay arming modes.

It is a further object of the present invention to provide a novel, simple, compact, self-contained battery operated security device that is reliable in action, effective in use, and inexpensive to manufacture.

Another object of the invention is to provide a security device that is easily installed on a door by the average homeowner, condo or apartment dweller without requiring specialized installation tools, material, knowledge, technique of rework of the existing door and frame structure.

It is still another object of this invention to provide homeowners and particularly condo and apartment dwellers, who must leave and return to their premises daily, a convenient, simple and reliable alarm device for their doors that does not require additional keys or other separate means to arm or de-arm the device upon leaving or entering their premises and means to change the de-arming code as needed.

Another object of this invention is to provide a device, the location of which is readily accessible to the authorized person but is mounted in a relatively inaccessible or tamper-proof location to the unauthorized person.

Still, a further object of this invention is to provide means for making the present device inoperative during periods of normal use.

The above objects as well as other and further objects, features and advantages of the present invention will be manifest in the following detailed description and preferred embodiment thereof when read in connection with the accompanying drawings which form a part of this specification. However, it must be clearly understood that these descriptions and drawings are not to be construed as defining the limits of the invention, for which purpose reference is made to the appended claims.

DESCRIPTION OF THE PREFERRED EMBODIMENT

Figures 1, 2, 3:
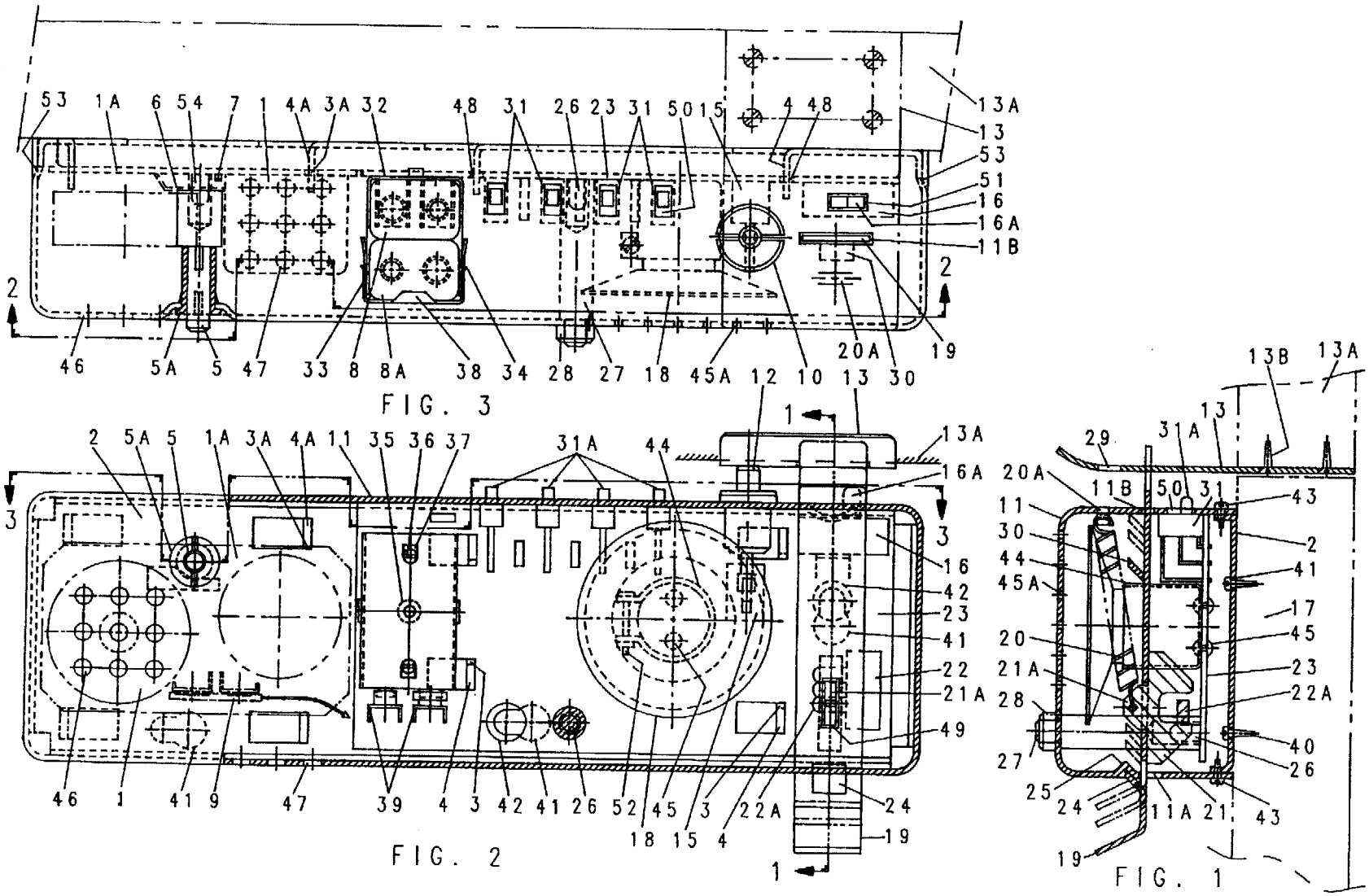
FIG. 1 is a sectional view taken thru the slide and door mounted jamb plate as shown by section plane 1—1 of FIG. 2.
FIG. 2 is a front view of the battery operated burglar alarm and door chime taken from inside the front cover in accordance with section plane 2—2 of FIG. 3.
FIG. 3 is a top view of the device based on the section plane 3—3 of FIG. 2.

Refer in detail to the drawings, wherein like and related numerals and symbols designate like and related parts throughout the several views. FIG. 1 shown a sectional view of the device mounted to a door 17 by means of a back plate 2, preferably fabricated metal, using back plate screws 40 thru back plate screw holes 41. Mounted to back plate 2 is a printed circuit board 23 to which all switches, detailed electrical components, speaker and batteries with holder are fastened. Four backplate printed circuit board tabs 4 having "V" grooves 3 and shown in FIGS. 2 and 3 formed from back plate 2 secure printed circuit board 23 against back plate 2 by means of an interference fit with printed circuit board slots 48. As a result, the printed circuit board assembly constitutes a completely independent electrical subassembly that cooperates with adjacent mechanical components to achieve the various operational modes.

A front cover 11, also preferably fabricated of metal, fits over back plate 2 and is fastened to back plate 2 using front cover screws 43. A slide 19 fits thru the bottom and top surfaces of front cover 11 thru front cover slide slots 11A and 11B respectively to cooperate with a jamb plate 13 containing jamb plate slot 29 and fastened to door jamb 13A using jamb plate screws 13B. Slide 19 has a lower slide tab 24 made to fit with a lower front cover detent 25 at its lower end and has an upper slide tab 30 at its other end. A slide switch actuator 21 attached to slide 19 projects over a slide switch button 22A of a three-position instant lock-alarm slide switch 22. A slide switch actuator tab 21A of slide switch actuator 21 fits thru slide 19 by means of a slide tab slot 49. A slide spring 20 is attached to the end of slide switch actuator tab 21A and to the top end to upper front cover detent 20A.

Figure 6:
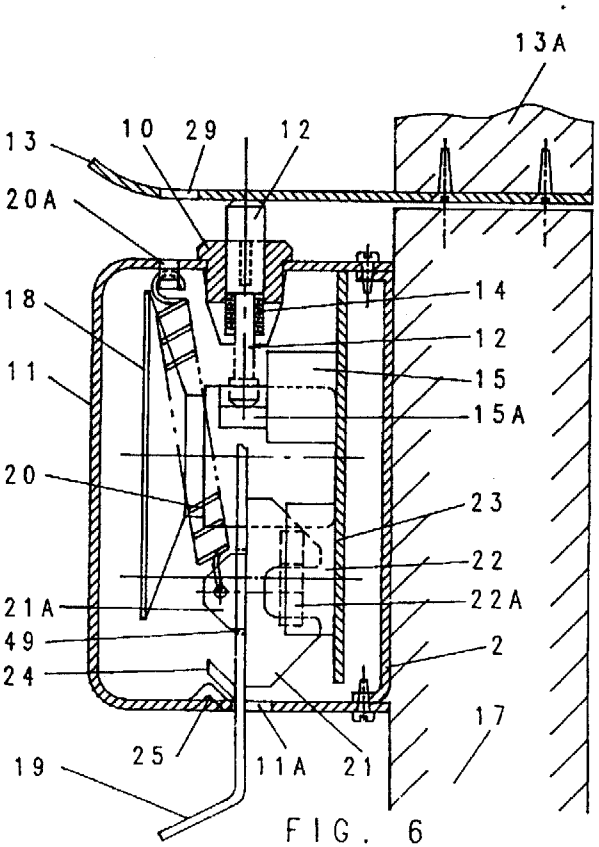
FIG. 6 is a sectional view taken thru the plunger and door jamb plate as shown by section plane 6—6 of FIG. 4.
Figure 5:
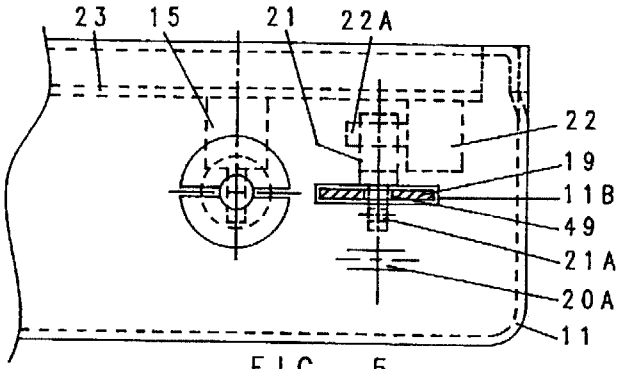
FIG. 5 is a partial right top view of the device showing the plunger and slide with the door jamb plate removed (View 5—5).
Figure 4:
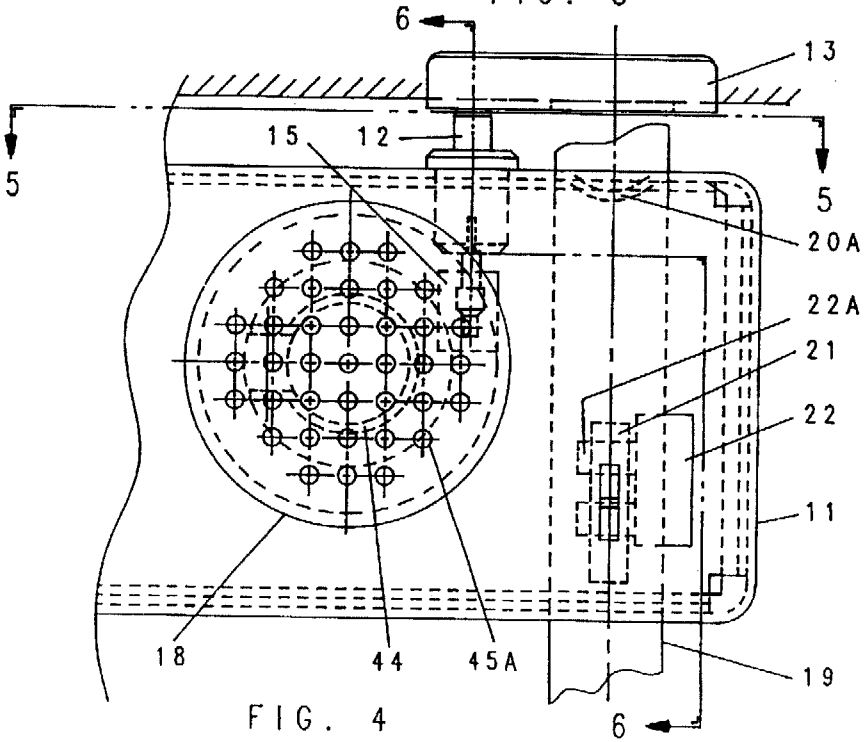
FIG. 4 is a partial right front view of the device showing the top end of the plunger in contact with the door jamb plate and the bottom end depressing the tab on the break-make spring return slide switch.

FIGS. 4, 5 and 6 show a plunger bushing 10 fastened to the top of front cover 11 and containing a plunger 12 actuated by a plunger spring 14. The top part of plunger 12 is in contact with jamb plate 13 and the bottom part in contact with a plunger slide switch button 15A of a make-break chime and delay alarm spring return plunger slide switch 15.

Four On/Off power two-position slide switches 31 are fastened to printed circuit board 23 at its top edge. The On/Off slide buttons 31A of On/Off power two-position slide switches 31 protrude above the top of front cover 11 thru front cover top slots 50 for access. The three-position instant lock-alarm slide switch 22 is fastened to printed circuit board 23 and located to have its three-position slide switch button 22A in-line with the projections of slide switch actuator 21 that is fastened to slide 19.

The make-break chime and delay alarm spring return plunger slide switch 15 is also fastened to printed circuit board 23 and has its plunger slide switch button 15A located in-line and directly below and in contact with the bottom surface of plunger 12.

FIGS. 2 and 3 show a chime and delay alarm mode selection two-position slide switch 16 fastened to printed circuit board 23 at its top edge. The chime and delay alarm mode selection slide button 16A of chime and delay alarm mode selection two-position slide switch 16 protrudes above the top of front cover 11 thru a front cover top slot 51 for access.

A bottom battery holder 32 is fastened to printed circuit board 23 with a rivet 35 and stabilized with two battery holder key tabs 36 protruding thru two circuit board key tab clearance holes 37. Two batteries 8 and 8A are secured in place by a top battery holder 33 which fastens to battery holder 32 by snapping over and engaging two battery holder locking tabs 34. Battery 8 is electrically connected to printed circuit board 23 using two battery snap terminals 39 which in turn are mechanically fastened and electrically connected to printed circuit board 23. Battery 8 supplies power to the Burglar Alarm and Door Chime device. Battery 8A supplies power to the optional smoke detector sensing unit 1. Top battery holder tabs 38 prevent battery 8A from sliding out of position.

A light emitting diode 26 is fastened to printed circuit board 23 and transfers its light to the outside of front cover 11 by using a light conducting plastic cylinder 27 fastened to front cover 11 using a plastic cylinder retaining ring 28 and located in-line with light emitting diode 26.

A speaker clamp 44 is fastened to printed circuit board 23 using speaker clamp rivets 45. A speaker clamp screw 52 clamps a speaker 18 to a speaker clamp 44. A multitude of speaker sound transmitting holes 45A are located in front cover 11 and in-line with speaker 18. Three printed circuit board clearance holes 42 are provided for access to back plate screw holes 41.

Two front cover detents 53 of FIG. 3 located in the sides of front cover 11 provide for a fixed depth of assembly of back plate 2 with respect to front cover 11.

Figure 7:
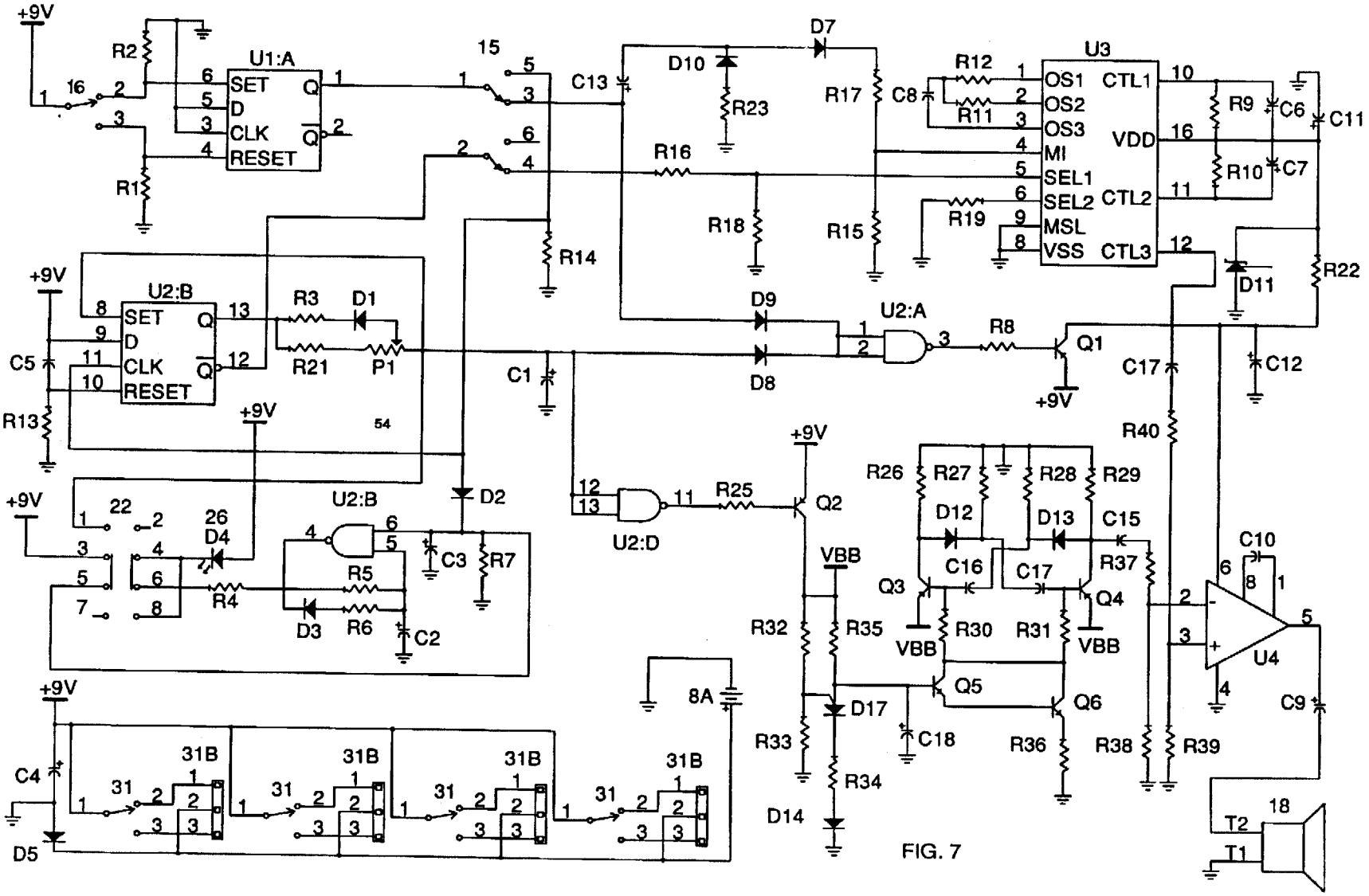
FIG. 7 is a wiring diagram showing the various switches and other electronic components, in symbolic form, required to achieve the necessary operational modes for the burglar alarm and door chime.

FIG. 7 shows a detailed electrical circuit schematic of the basic Burglar Alarm and Door Chime. Battery 8 supplies power to the Burglar Alarm and Door Chime device thru the four On/Off power two-position slide switches 31 to the three-position instant lock-alarm slide switch 22 and its circuitry, the chime and delay alarm mode selection two-position slide switch 16 and its circuitry, to the make-break chime and delay alarm spring return plunger slide switch 15 and its circuitry. All of the foregoing actuate speaker 18 with its circuitry to sound an alarm and flash light emitting diode 26. Four jumper pin switches 31B provide means to reverse the polarity of said four On/Off power two-position slide switches 31 and RC circuit 54 provides means to vary the entry delay time.

FIGS. 2 and 3 show an optional smoke detector sensing unit 1 fastened to back plate 2 and connected to battery 8A using snap cable 9. Four back plate smoke detector tabs 4A formed from back plate 2 and having "V" grooves 3A provide a snap interference fit with a smoke detector printed circuit board 1A to which all smoke detector components are mounted. A multitude of smoke detector vent holes 47 are provided in addition to a multitude of smoke detector sound transmitting holes 46 located in front cover 11.

A smoke detector light transmitting test plunger 5 is enclosed and captured by a smoke detector guide bushing 5A which is snap fastened to front cover 11. The smoke detector light transmitting test plunger 5 is piloted over a smoke detector light emitting diode 54 and is also located in line with a smoke detector sensing unit spring test contact 6 to enable contact with a smoke detector sensing unit fixed test contact 7 to check the working status of smoke detector sensing unit 1.

Operation of the Preferred Embodiment

The three modes of operation of the Burglar Alarm and Door Chime device are as follows:

1. Instant Lock-Alarm/Interior Security Mode:

Refer to FIG. 1 showing slide 19 in the "un-armed slide position" with door 17 closed. The four On/Off power two-position slide switches 31 are shown in FIG. 3 in a power "Off" mode with their slide tabs oriented toward the back plate 2. Move any one or several of the slide tabs toward the front cover 11 to effect the power "On" mode of the four On/Off power two-position slide switches 31. Disengage slide tab 224 of slide 19 from front cover detent 25 of front cover 11. Allow slide spring 20 to raise slide 19 until it engages the underside of jamb plate 13. During this movement slide switch actuator 21 of slide 19 will move slide switch button 22A of three-position instant lock-alarm slide switch 22 to the "armed slide position" from its original "unarmed slide position." This slide position causes light emitting diode 26 to flash and transfer its light to the outside of front cover 11 by using light conducting plastic cylinder 27 fastened to front cover 11. The flashing light indicates to an authorized person located on the interior side of the secured area that the device is in the armed mode. Unauthorized opening of door 17 causes slide 19 to pass thru jamb plate slot 29 to achieve the "instant lock-alarm position" by effecting a dead bolt lock with jamb plate 13 and simultaneously moving side switch button 22A of three-position lock-alarm slide switch 22 to sound speaker 18. Moving slide 19 back to the "unarmed slide position" and because the electric circuit was latched it will not cause speaker 18 to stop sounding. However, placing the four On/Off power two-position slide switches 31 in the one "Off" mode known only to the authorized person will cause the speaker 18 to cease sounding.

2. Delay Alarm/Exterior Security Mode:

Refer to FIGS. 2, 3 and 7 showing the four On/Off power two-position slide switches 31 in the one "Off" mode and the chime and delay alarm mode selection two-position slide switch 16 in the left slide position to effect the Delay Alarm/Exterior Security Mode. In this position jamb plate 13 depresses plunger 12 which further depresses plunger slide switch button 15A of make-break chime and delay alarm spring return plunger slide switch 15. Open door 17 from the interior area to be secured and with chime and delay alarm mode selection two-position slide switch 16 in the left slide position place the four On/Off power two-position slide switches 31 in one of fifteen "On" modes. Referring to FIGS. 6 and 7, opening door 17 will cause plunger 12 to clear jamb plate 13 and rise which also causes plunger slide switch button 15A of make-break chime an delay alarm spring return plunger slide switch 15 to rise and effect the pre-arm condition of the device. Light emitting diode 26 will commence flashing which further confirms the pre-arm condition of the Delay Alarm/Exterior Security Mode. The authorized person will then exit the interior area to be secured to the exterior area and close door 17. This action depresses plunger 12 by jamb plate 13 and causes the device to achieve the armed condition and light emitting diode 26 to cease flashing. Unauthorized opening of door 17 will cause speaker 18 to sound after a preset delay period and cause light emitting diode 26 to flash. Closing door 17 will not silence speaker 18 since the electric circuit is latched or case flashing light emitting diode 26 to cease flashing. However, placing the four On/Off power two-position slide switches 32 in the one "Off" mode known only to the authorized person will silence speaker 18 and cause light authorized diode 26 to cease functioning and de-arm the device.

3. Door Chime Annunciator Mode:

Referring again to FIGS. 2, 3, 6 and 7 which show the four On/Off Power two-position slide switches 31 in the one "Off" mode and the chime and delay alarm mode selection two-position slide switch 16 in the left slide position to effect the Delay Alarm/Exterior Security Mode. However, to achieve the Door Chime Annunciator Mode, move chime and delay alarm selection two-position slide switch 16 to the right slide position and place the four On/Off power two-position slide switches 31 in any one of the fifteen "On" modes. Opening and closing door 17 will alternately raise and lower plunger 12 in conjunction with plunger slide switch button 15A of make-break chime and delay alarm spring return plunger slide switch 15 to cause speaker 18 to emit pleasant chime tones.

4. Optional Smoke Detector Sensing Unit:

FIGS. 2 and 3 show an optional, independently powered smoke detector sensing unit 1 of known manufacture mounted to back plate 2. Smoke passing thru smoke detector vent holes 47 in front cover 11 will trigger the smoke detector to sound thru transmitting holes 46 also located in front cover 11. Pressing smoke detector light transmitting test plunger 5 checks the functionality of smoke detector sensing unit 1 by sounding its horn. Periodic flashing of light from light emitting diode 54 and transmitted to the tip of light transmitting test plunger 5 is a further indication of the unit's proper functionality.

While my above description contains many specificities, these should not be construed as limitations on the scope of the invention, but rather as an exemplification of one preferred embodiment thereof. Many other variations are possible. For example, the front cover 11 and back plate 2 may be fabricated of suitable plastics. Rocker or magnetic actuated switches may be substituted for the slide switches where applicable. Also, the number of power On/Off switches may vary from the four switches shown. A piezoelectric speaker may be used instead of the magnetic/coil type. Also, the slide 19 may be cylindrical in cross-section instead of rectangular and so forth. Accordingly, the scope of the invention should be determined not by the embodiment illustrated, but by the appended claims and their legal equivalents.

I claim:

1. A burglar alarm and door chime comprising:

a. a back fastened to the inside of a door and [containing] *cooperating with* electric circuit logic means *further* cooperating with an "instant lock-alarm" mode electric switching means and "chime"/"delay alarm" modes electric switching means, audible alarm and chime means [and electric power supply means, and having] *cooperating with electric power supply means and* "On" and "Off" power *electric* switch means, and b. a front cover containing manual arming spring-biased "instant lock-alarm" slide means [engaged in mechanical contact] *cooperating* with said "instant lock-alarm" mode electric switching means of said [back plate] *burglar alarm and door chime* and a spring-actuated plunger means [engaged in mechanical contact] *cooperating* with said "chime"/"delay alarm" modes electric switching means of said [back plate] *burglar alarm and door chime* when said front cover is fastened to said back plate, and c. a jamb plate fastened to a door jamb cooperating with said manual arming spring-biased "instant lock-alarm" slide means of said front cover during the opening of said door to effect the "instant lock-alarm" mode of said burglar alarm and door chime, said spring-actuated plunger means of said front cover further cooperating with said jamb plate to automatically engage and disengage contact with said jamb plate during the closing and opening of said door to automatically actuate said "chime"/"delay alarm" modes electric switching means of said [back plate] *burglar alarm and door chime* to thereby effect the manually selected mode (i.e. "chime" or "delay alarm" mode) responsive to the opening and closing of said door.

2. The burglar alarm and door chime of claim 1 wherein:

a. said spring-biased "instant lock-alarm" slide means cooperates with said "instant lock-alarm" switch means to effect an instant audible alarm having electric circuit latching means and also functions as a mechanical dead bolt lock, in cooperation with said jamb plate and b. said "chime"/"delay alarm" modes electric switching means of said [back plate] *burglar alarm and door chime* comprise manual selection mode switching means and a make-break spring return switch cooperating with said spring-actuated plunger means whereby "chime" or "delay alarm" operational modes may be manually selected for said burglar alarm and door chime, and said audible alarm and chime means comprises a speaker, said "On" and "Off" *power* electric switch means comprises a plurality of accessible manually operated electric switching means in series with said electric power supply means to manually activate or deactivate said burglar alarm and door chime and said electric power supply means comprises a battery.

3. The burglar alarm and door chime of claim 2 wherein:

a. said lock-alarm slide means comprises a slide having "armed", "instant lock-alarm", and "unarmed" slide positions slidably attached to said front cover, said slide being spring-biased to move through slots in said front cover to manually engage said jamb plate for the "armed" slide position, said jamb plate containing an aperture to automatically capture said slide during the opening of said door to effect the "instant lock-alarm" slide position, said slide having stop means engaging said front cover to effect the "unarmed" slide position, and b. said spring-actuated plunger means of said front cover comprises a bushing attached to said front cover encasing a spring-biased plunger which upwardly engages said jamb plate at one end of said plunger and [engages] *cooperates with* said—make-break—spring return switch at the other end while said door is closed, said plunger rising upward after clearing said jamb plate when said door is opened to actuate said—make-break—spring return switch cooperating with said manual selection mode switching means to effect a pre-arm condition of said "delay alarm" operational mode of said "chime"/"delay alarm" modes electrical switching means during the opening of said door and cause said jamb plate to depress said plunger and *actuate* said—make-break—spring return switch to effect an armed condition of said "delay alarm" operational mode during the closing of said door, and causing a pre-set entry delay time means of said electric circuit logic means to cause said "delay alarm" operational mode of said "chime"/"delay alarm" electric switching means to be responsive to the opening of said door to activate said audible alarm means after a predetermined delay time, or (if the "chime" mode of said manual selection mode switching means has been selected) to effect said "chime" operational mode during the opening and closing of said door.

4. The burglar alarm and door chime of claim 3 wherein said electric circuit logic *means* includes variable time delay means for said "delay alarm" operational mode and light flashing means responsive to said "armed" slide position, said "instant lock-alarm" slide position and said "delay alarm" operational mode, said "On" and "Off" *power* electric switch means cooperating with additional electric switching means whereby the combination of said "On" and "Off" *power* electric switching means required to deactivate said burglar alarm and door chime can be altered.

5. The burglar alarm and door chime of claim 1 further including a smoke detection sensing unit fastened to said [back plate of said] burglar alarm and door chime.

6. The burglar alarm and door chime of claim 5 wherein said smoke detection sensing unit comprises visual and manual functional testing means attached to said [front cover] *burglar alarm and door chime* and includes an independent power supply means.

7. A burglar alarm and door chime comprising:

a. a back plate fastened to a front cover forming a hollow enclosure therewith, said back plate fastened to a door on the protected enclosure side of said door, said back plate having upper and lower and side surfaces to locate and fasten said front cover to said back plate, and b. said front cover containing manual arming spring-biased "instant lock-alarm" slide means [engaged in mechanical contact] *cooperating* with "instant lock-alarm" mode electric switching means fastened to a printed circuit board, said printed circuit board fastened to said back plate, and said "instant lock-alarm" mode electric switching means cooperating with electric circuit logic means of said printed circuit board, and c. said front cover containing spring-actuated plunger means [engaged in mechanical contact] *cooperating* with "chime"/"delay alarm" modes electric switching means fastened to said printed circuit board, said printed circuit board fastened to said back plate, and said "chime"/"delay alarm" modes electric switching means cooperating with electric circuit logic means of said printed circuit board, and d. a jamb plate having an opening therethrough and fastened to a door jamb and cooperating with said manual arming spring-biased "instant lock-alarm" slide means of said front cover during the opening of said door to effect the "instant lock-alarm" mode of said burglar alarm and door chime, and said spring-actuated plunger means of said front cover further cooperating with said jamb plate to automatically engage and disengage contact with said jamb plate during the closing and opening of said door to automatically actuate said "chime"/"delay alarm" modes electric switching means of said [back plate] *burglar alarm and door chime* to thereby effect the operating mode of choice of said "chime" and "delay alarm" modes for the opening and closing of said door, and e. said printed circuit board containing audible alarm and chime means and *cooperating with* "On" and "Off" *power* electric switching means cooperating with electric circuit logic means to activate or deactivate said burglar alarm and door chime in combination with electric power supply means.

8. The burglar alarm and door chime of claim 7, wherein:

a. said spring-biased "instant lock-alarm" slide means cooperates with said "instant lock-alarm" switch means to effect an instant audible alarm having electric circuit latching means and also function as a mechanical dead bolt lock, in cooperation with and jamb plate and b. said "chime"/"delay alarm" modes electric switching means of said back plate comprise manual selection mode switching means and a —make-break—spring return switch cooperating with said spring-actuated plunger means whereby "chime" or "delay alarm" operational modes may be manually selected for said burglar alarm and door chime, and c. said audible alarm and chime means comprises a speaker, said "On" and "Off" *power* electric switch means comprises a plurality of accessible manually operated electric switching means in series with said electric power supply means to manually activate or deactivate said burglar alarm and door chime and said electric power supply means comprises a battery.

9. The burglar alarm and door chime of claim 8 wherein:

a. said lock-alarm slide means comprises a slide having "armed", "instant lock-alarm", and "unarmed" slide positions slidably attached to said front cover, said slide being spring-baised to move through slots in said front cover to manually engage said jamb plate for the "armed" slide position, said jamb plate containing an aperture to automatically capture said slide during the opening of said door to effect the "instant lock-alarm" slide position, said slide having stop means engaging said front cover to effect the "unarmed" slide position, and b. said spring-actuated plunger means of said front cover comprises a bushing attached to said front cover encasing a spring-biased plunger which upwardly engages said jamb plate at one end of said plunger and [engages] *actuates* said —make-break—spring return switch at the other end while said door is closed, said plunger rising upward after clearing said lamb plate when said door is opened to actuate said—make-break—spring return switch cooperating with said manual selection mode switching means to effect a pre-arm condition of said "delay alarm" operational mode of said "chime"/"delay alarm" modes electrical switching means during the opening of said door and cause said jamb plate to depress said plunger and *actuate* said—make-break—spring return switch to effect an armed condition of said "delay alarm" operational mode during the closing of said door and causing a pre-set entry delay time means of said electric circuit logic means to cause said "delay alarm" operational mode of said "chime"/"delay alarm" electric switching means to be responsive to the opening of said door to activate said audible alarm means after a pre-determined delay time, or (if the "chime" mode of said manual selection mode switching means has been selected) to effect said "chime" operational mode during the opening and closing of said door.

10. The burglar alarm and door chime of claim 9 wherein: said electric circuit logic includes variable time delay means for said "delay alarm" operational mode and light flashing means responsive to said "armed" slide position, said "instant lock-alarm" slide position and said "delay alarm" operational mode, said "On" and "Off" *power* electric switch means cooperating with additional electric switching means whereby the combination of said "On" and "Off" *power* electric switching means require to deactivate said burglar alarm and door chime can be altered.

11. The burglar alarm and door chime of claim 7 further including a smoke detection sensing unit fastened to said [back plate of said] burglar alarm and door chime.

12. The burglar alarm and door chime of claim 11 wherein said smoke detection sensing unit comprises visual and manual functional testing means attached to said [front cover] *burglar alarm and door chime* and includes an independent power supply means.

13. A burglar alarm and door chime comprising:

a. an electrical subassembly mounted to a circuit board and containing electric circuit logic means, and electric power supply means, said electric circuit logic means comprising "instant lock-alarm" and "chime"/"delay alarm" modes electric switching means, said electrical subassembly mounted to said circuit board comprising a self-contained operational electrical subassembly unit detachably secured to a back plate, said back plate fastened to a door, and b. a mechanical subassembly attached to a front cover and said front cover comprising mechanical manual arming spring-biased "lock-alarm" actuation means and automatic spring-actuated plunger "chime"/"delay alarm" actuation means, said mechanical subassembly attached to said front cover comprising a self-contained mechanical subassembly actuation unit detachably secured to said back plate whereby said mechanical manual spring-biased arming "lock-alarm" actuation means and said automatic plunger actuated "chime"/"delay alarm" actuation means of said self-contained mechanical subassembly actuation unit simultaneously and operationally engage said "instant lock-alarm" and said "chime"/"delay alarm" modes electric switching means of said self-contained operation electrical subassembly unit, and c. a jamb plate fastened to a door jamb and cooperating with said mechanical manual arming spring-biased "instant lock-alarm" actuation means to effect the "lock-alarm" mode of said burglar alarm and door chime, and said automatic spring-actuated plunger "chime"/"delay alarm" actuation means cooperating with manually operated mode selection switching means attached to said circuit board of said self-contained operational electrical subassembly unit to manually effect the mode of choice for said burglar alarm and door chime, and an audible alarm means responsive to said "lock-alarm" and said "chime"/"delay alarm" modes electric switching means, said audible alarm means cooperating with said electric power supply means to sound an alarm upon the actuation of said "instant lock-alarm" or said "chime" and "delay alarm" modes, and "On" and "Off" *power* electric switch means cooperating with said electric power supply means to activate or deactivate said burglar alarm and door chime, and said "On" and "Off" *power* electric switch means cooperating with additional switch means whereby the combination of said "On" and "Off" *power electric* switch means required to deactivate said burglar alarm and door chime can be altered, and said "delay alarm" means having variable time delay means cooperating with said electric circuit logic means.

14. The burglar alarm and door chime of claim 13 wherein said electric circuit logic includes light flashing means responsive to "armed" and "dead bolt lock" operational states of said "instant lock-alarm" mode and said "delay alarm" operational state of said "chime" and "delay alarm" modes.

15. The burglar alarm and door chime of claim 13 further including a smoke detection sensing unit independently fastened to said back plate and including independent power supply means, said smoke detection sensing unit comprising visual and manual functional testing means attached to said front cover of said self-contained mechanical subassembly actuation unit, said visual and manual functional testing means attached to sad front cover and cooperating with said smoke detection sensing unit independently fastened to said back plate to visually and mechanically operationally test said smoke detection sensing unit from said front cover.

*16. A burglar alarm and door chime comprising:*

*a. a back plate fastened to the inside of a door having a front cover detachably secured to said back plate, said back plate and said front cover forming a hollow enclosure therein, said hollow enclosure containing electric circuit logic means cooperating with an "instant lock-alarm" mode electric switching means and "chime"/"delay" modes electric switching means, said "chime"/"delay" modes electric switching means accessibly secured to said hollow enclosure, audible alarm and chime means and electric power supply means, and*

*b. "On" and "Off" power electric switch means accessibly secured to said hollow enclosure and cooperating with said electric circuit logic means and said electric power means, and*

*c. a manual arming spring-biased slide means attached to said hollow enclosure and cooperating with said "instant lock-alarm" mode electric switching means of said electric circuit logic means, and*

*d. a spring-actuated plunger means attached to said hollow enclosure cooperating with said "chime"/"delay alarm" modes electric switching means of said electric circuit logic means, and*

*e. a jamb plate fastened to a door jamb cooperating with said manual arming spring-biased slide means and said "instant lock-alarm" mode electric switching means of said electric circuit logic switch means to effect the "instant lock-alarm" mode of said burglar alarm and door chime responsive to the opening of said door, and said jamb plate further cooperating with said spring-actuated plunger means attached to said hollow enclosure cooperating with said "chime"/"delay alarm" modes electric switching means of said electric circuit logic means to automatically effect the "chime"/"delay alarm" modes of said burglar alarm and door chime to thereby effect the manually selected mode (i.e. "chime" or "delay alarm" mode) responsive to the opening and closing of said door.*

*17. The burglar alarm and door chime of claim 16 wherein:*

*a. said spring-biased "instant lock-alarm" slide means cooperates with said "instant lock-alarm" switch means to effect an instant audible alarm having electric circuit latching means and also functions as a mechanical dead bolt lock, in cooperation with said jamb plate, and*

*b. said "chime"/"delay alarm" modes electric switching means accessibly secured to said hollow enclosure comprise manual selection mode switching means and a make-break spring return switch cooperating with said spring-actuated plunger means whereby "chime" or "delay alarm" operational modes may be manually selected for said burglar alarm and door chime, and* c. said audible alarm and chime means comprises a speaker, said "On" and "Off" power electric switch means comprises a plurality of accessible manually operated electric switching means in series with said electric power supply means to manually activate or deactivate said burglar alarm and door chime and said electric power supply means comprises a battery.

*18. The burglar alarm and door chime of claim 17 wherein:*

*a. said lock-alarm slide means comprises a slide having "armed", "instant lock-alarm", and "unarmed" slide positions slidably attached to said front cover, said slide being spring-biased to move through slots in said front cover to manually engage said jamb plate for the "armed" slide position, said jamb plate containing an aperture to automatically capture said slide during the opening of said door to effect the "instant lock-alarm" slide position, said slide having stop means engaging said front cover to effect the "unarmed" slide position, and*

*b. said spring-activated plunger means of said front cover comprises a bushing attached to said front cover encasing a spring-biased plunger which upwardly engages said jamb plate at one end of said plunger and cooperates with said—make-break—spring return switch at the other end while said door is closed, said plunger rising upward after clearing said jamb plate when said door is opened to actuate said—make-break—spring return switch cooperating with said manual selection mode switching means to effect a pre-arm condition of said "delay alarm" operational mode of said "chime"/"delay alarm" modes electrical switching means during the opening of said door and cause said jamb plate to depress said plunger and actuate said—make-break—spring return switch to effect an armed condition of said "delay alarm" operational mode during the closing of said door, and causing a pre-set entry delay time means of said electric circuit logic means to cause said "delay alarm" operational mode of said "chime"/"delay alarm" electric switching means to be responsive to the opening of said door to activate said audible alarm means after a pre-determined delay time, of (if the "chime" mode of said manual selection mode switching means has been selected) to effect said "chime" operational mode during the opening and closing of said door.*

*19. The burglar alarm and door chime of claim 18 wherein said electric circuit logic means includes variable time delay means for said "delay alarm" operational mode and light flashing means responsive to said "armed" slide position, said "instant lock-alarm" slide position and said "delay alarm" operation mode, said "On" and "Off" power electric switch means cooperating with additional electric switching means whereby the combination of said "On" and "Off" power electric switching means required to deactivate said burglar alarm and door chime can be altered.*

*20. The burglar alarm and door chime of claim 16 further including a smoke detection sensing unit fastened to said hollow enclosure of said burglar alarm and door chimr wherein said smoke detection sensing unit includes an independent power supply means and comprises visual and manual functional testing means cooperating with said smoke detection sensing unit.*

* * * * *